March 4, 1941.  J. F. PAGENDARM  2,233,484
MANUFACTURE OF COMPOSITE STRUCTURES
Filed May 15, 1939  6 Sheets-Sheet 1

INVENTOR
John F. Pagendarm
BY Robert H. Eckhoff
ATTORNEY

March 4, 1941. J. F. PAGENDARM 2,233,484
MANUFACTURE OF COMPOSITE STRUCTURES
Filed May 15, 1939 6 Sheets-Sheet 2

INVENTOR
John F. Pagendarm
BY Robert H. Eckhoff
ATTORNEY

March 4, 1941. J. F. PAGENDARM 2,233,484
MANUFACTURE OF COMPOSITE STRUCTURES
Filed May 15, 1939 6 Sheets-Sheet 3
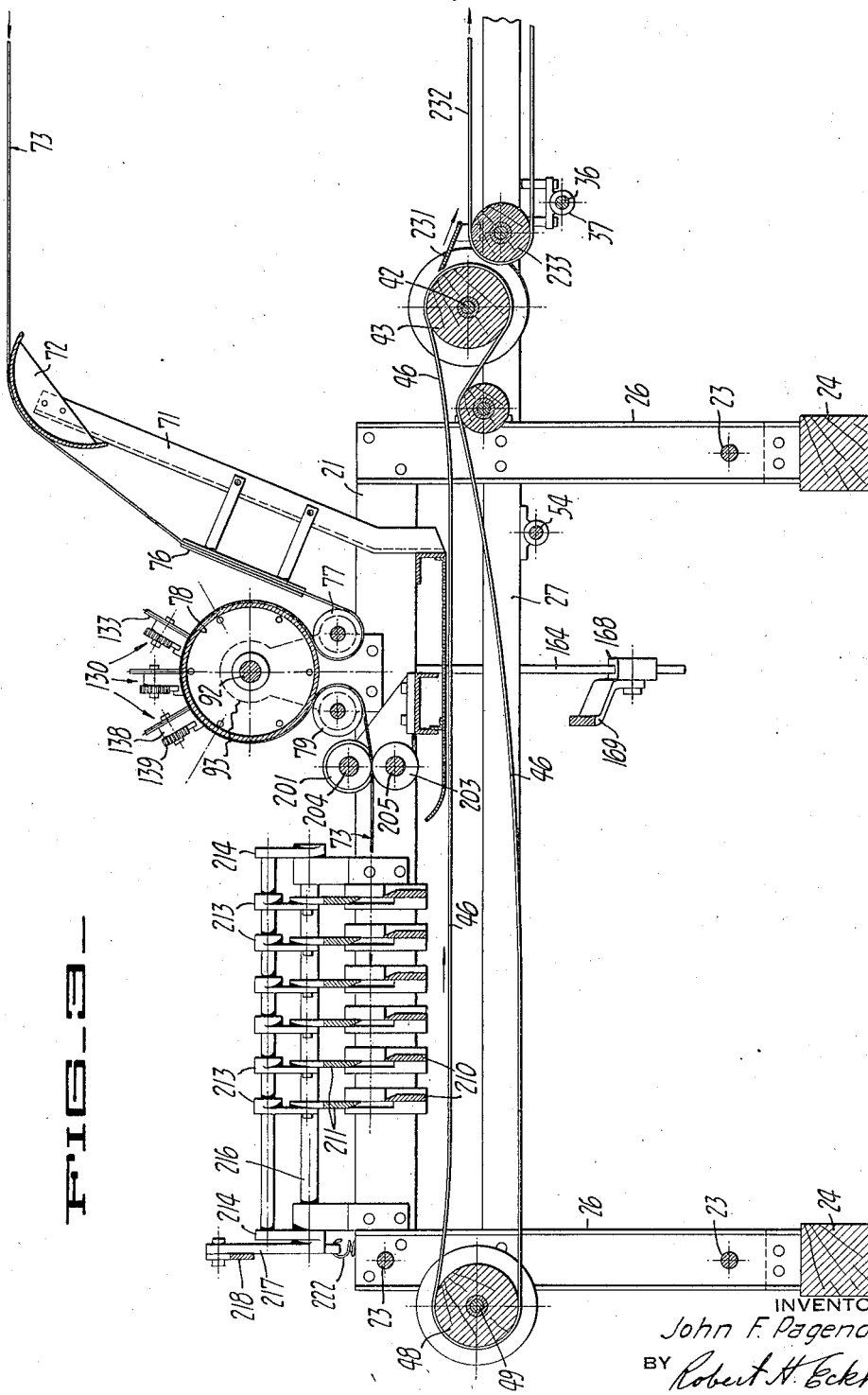
INVENTOR
John F. Pagendarm
BY Robert H. Eckhoff
ATTORNEY March 4, 1941.  J. F. PAGENDARM  2,233,484
MANUFACTURE OF COMPOSITE STRUCTURES
Filed May 15, 1939    6 Sheets-Sheet 4
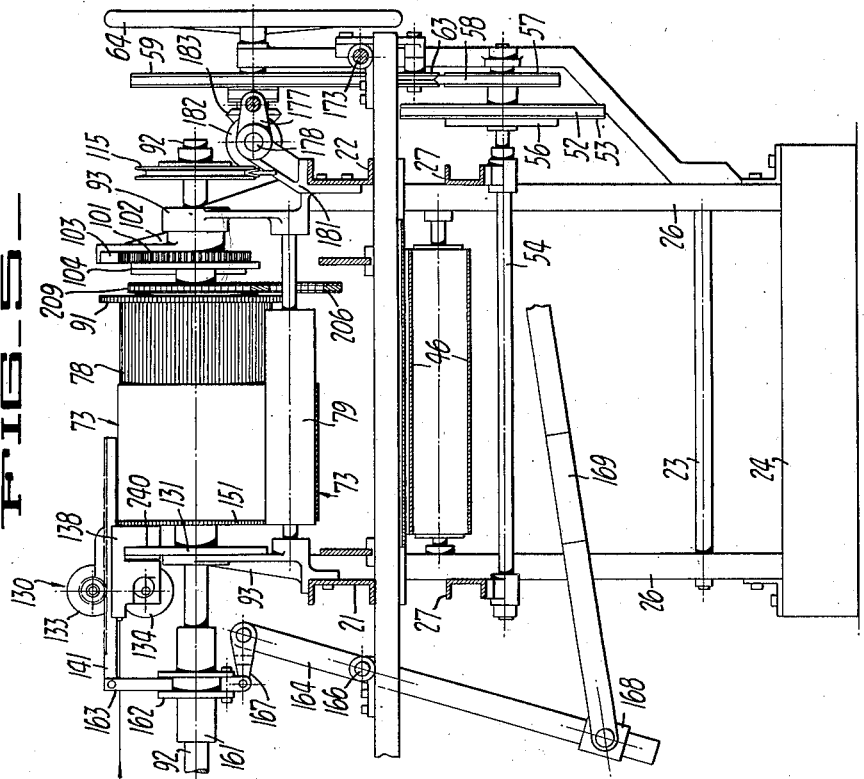
INVENTOR
John F. Pagendarm
BY Robert H. Eckhoff
ATTORNEY March 4, 1941. J. F. PAGENDARM 2,233,484
MANUFACTURE OF COMPOSITE STRUCTURES
Filed May 15, 1939 6 Sheets-Sheet 5
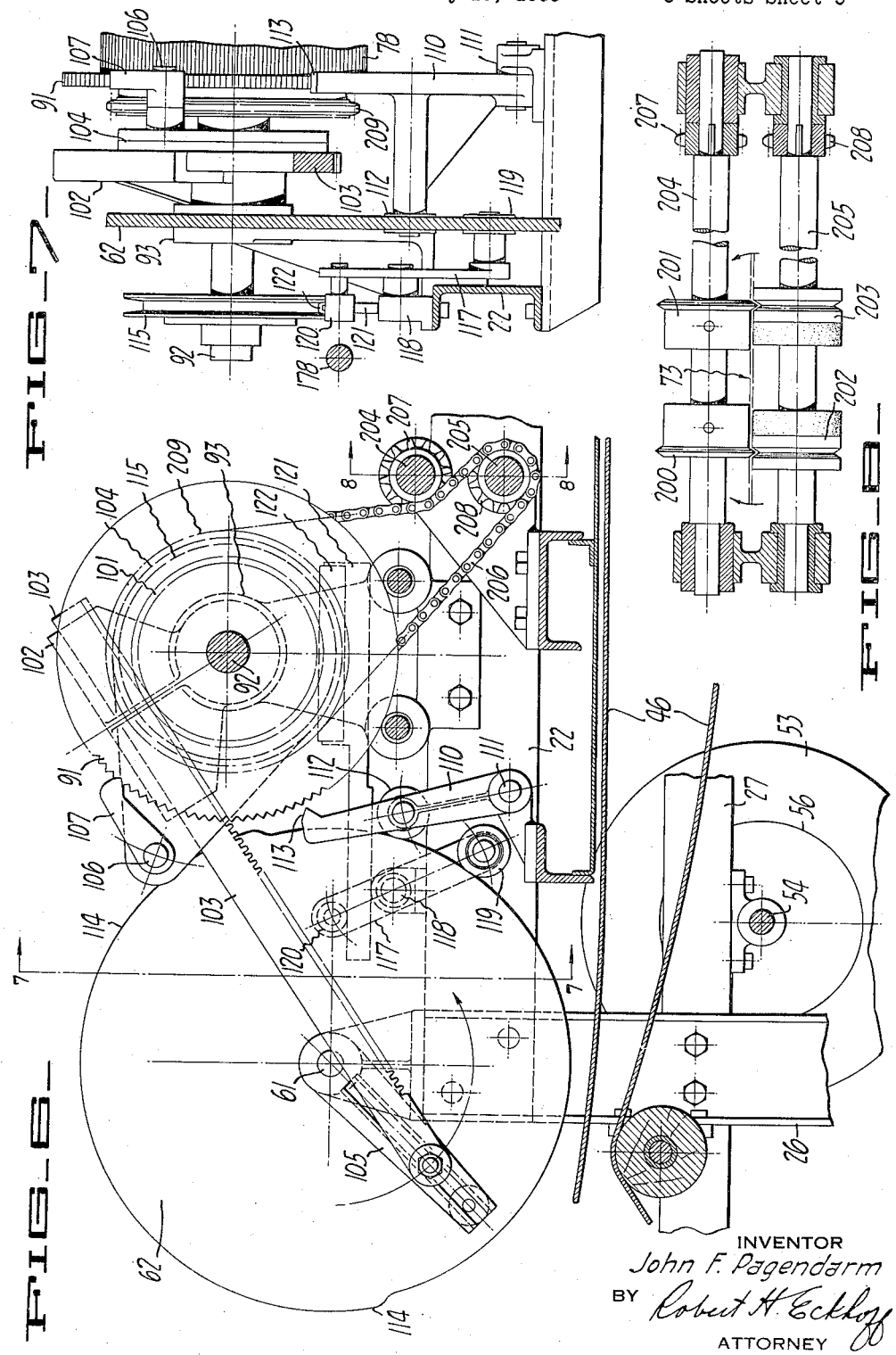
INVENTOR
John F. Pagendarm
BY Robert H. Eckhoff
ATTORNEY March 4, 1941. J. F. PAGENDARM 2,233,484
MANUFACTURE OF COMPOSITE STRUCTURES
Filed May 15, 1939 6 Sheets-Sheet 6
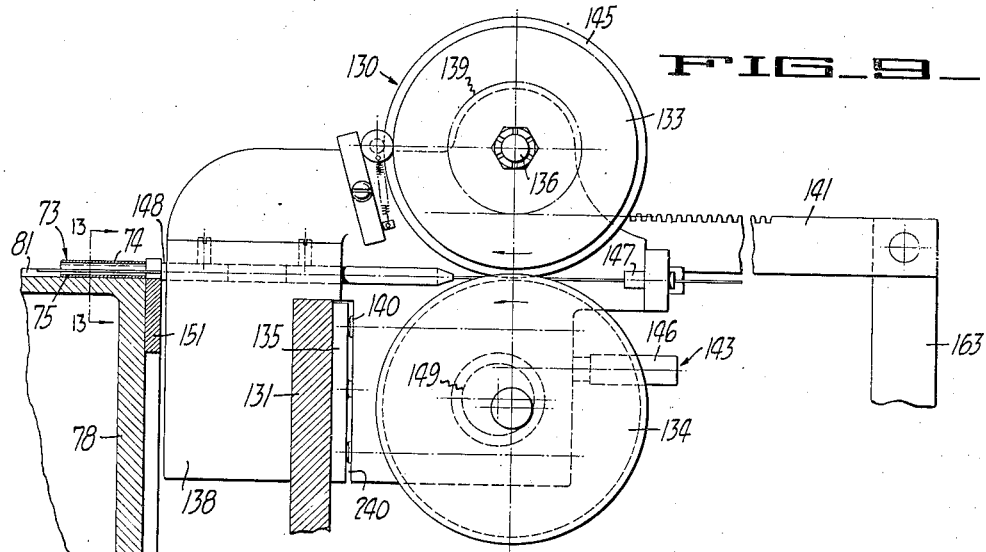
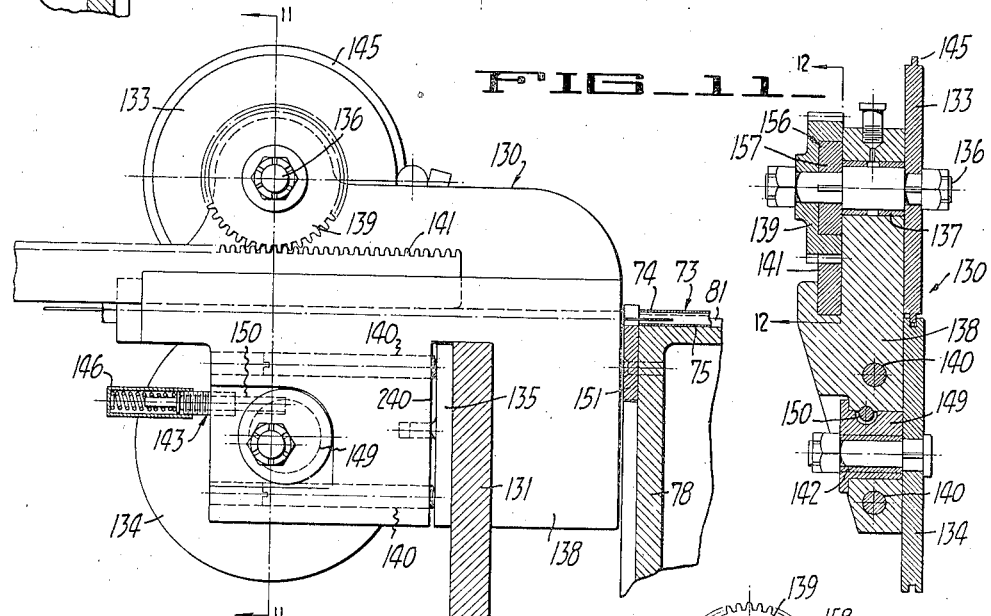
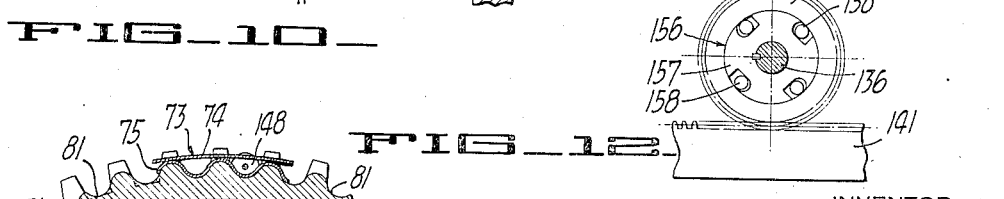
INVENTOR
John F. Pagendarm
BY Robert H. Eckhoff
ATTORNEY Patented Mar. 4, 1941

2,233,484

UNITED STATES PATENT OFFICE 2,233,484

MANUFACTURE OF COMPOSITE STRUCTURES

John F. Pagendarm, Oakland, Calif., assignor to Bemiss Corporation, a corporation of California Application May 15, 1939, Serial No. 273,657

10 Claims. (Cl. 154—1)

This invention relates to the manufacture of composite structures including a facing sheet having bonded thereto one or more sheets including a continuously corrugated member to provide corrugated paper or corrugated board structures. It has been proposed by Bemiss in application Serial Number 207,023 filed May 10, 1938 to provide wire inserts in such composite structure to the end that the board, when bent into shape, is resilient, retains its shape, and is available and suitable for use in automatic packaging machines. This invention is particularly concerned with a machine for inserting wire into such a composite structure, particularly one which will operate rapidly, efficiently in a simple manner to insert and secure a plurality of wires into a corrugated composite structure.

It is in general the broad object of the present invention to provide a machine for automatically inserting into a composite structure a plurality of resilient wires.

Another object of the present invention is to provide a relatively simple, and yet a rapidly operating machine of the character described.

The machine in the present invention includes other advantageous features and objects, some of which, together with the foregoing, will appear hereinafter wherein the present preferred form of machine of this invention is disclosed.

In the drawings accompanying and forming a part hereof, Figure 1 is a side elevation showing the assembled machine.

Figure 3 is a section taken along the line 3—3 in Figure 2.

Figure 4 is a section taken along the line 4—4, Figure 1.

Figure 5 is a section taken along the line 5—5 in Figure 1.

Figure 6 is a section taken along the line 6—6 in Figure 2.

Figure 7 is a section taken along the line 7—7 in Figure 6.

Figure 8 is a section taken along the line 8—8 of Figure 6.

Figure 1:
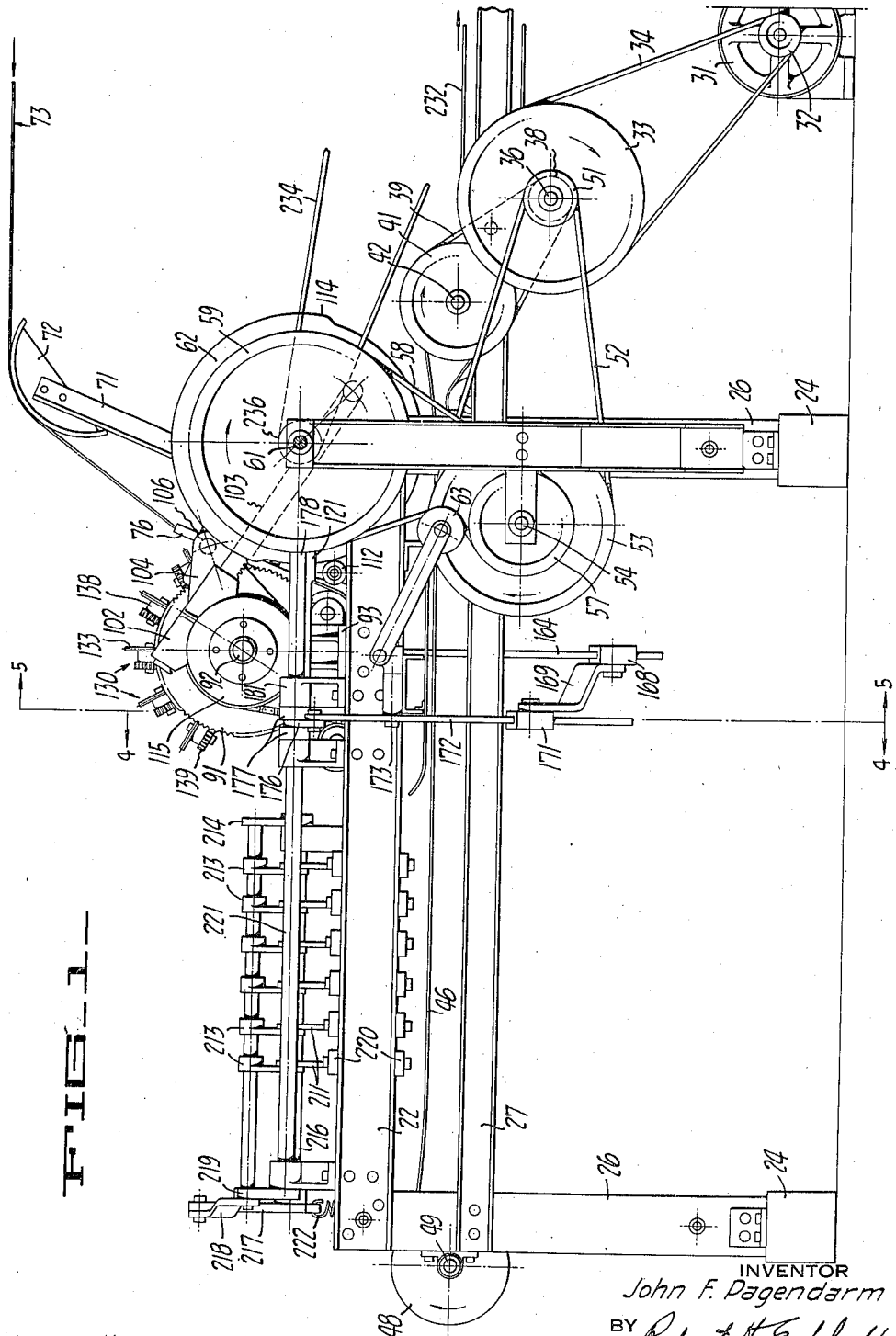

Figures 9 and 10 are opposite side elevations through the wire feeding mechanism, while Figures 11 and 12 are respectively sections taken along the lines 11—11 and 12—12 of Figures 9 and 11.

Figure 13 is an enlarged fragmentary view showing the relation between the drum, the composite sheet on the drum, and the wire insert.

The frame

The machine of the present invention includes a frame made up of suitable horizontally extending opposite side rails or channels 21 and 22. These are suitably joined together by transverse bracing members 23 to provide a frame which is supported upon a base 24 by vertical legs 26 provided by channels or other suitable structural elements. Lower side rails 27 are also provided by suitable channels to stiffen the frame and provide a support for the various elements in the machine, as will presently appear.

The power unit

Figure 2:
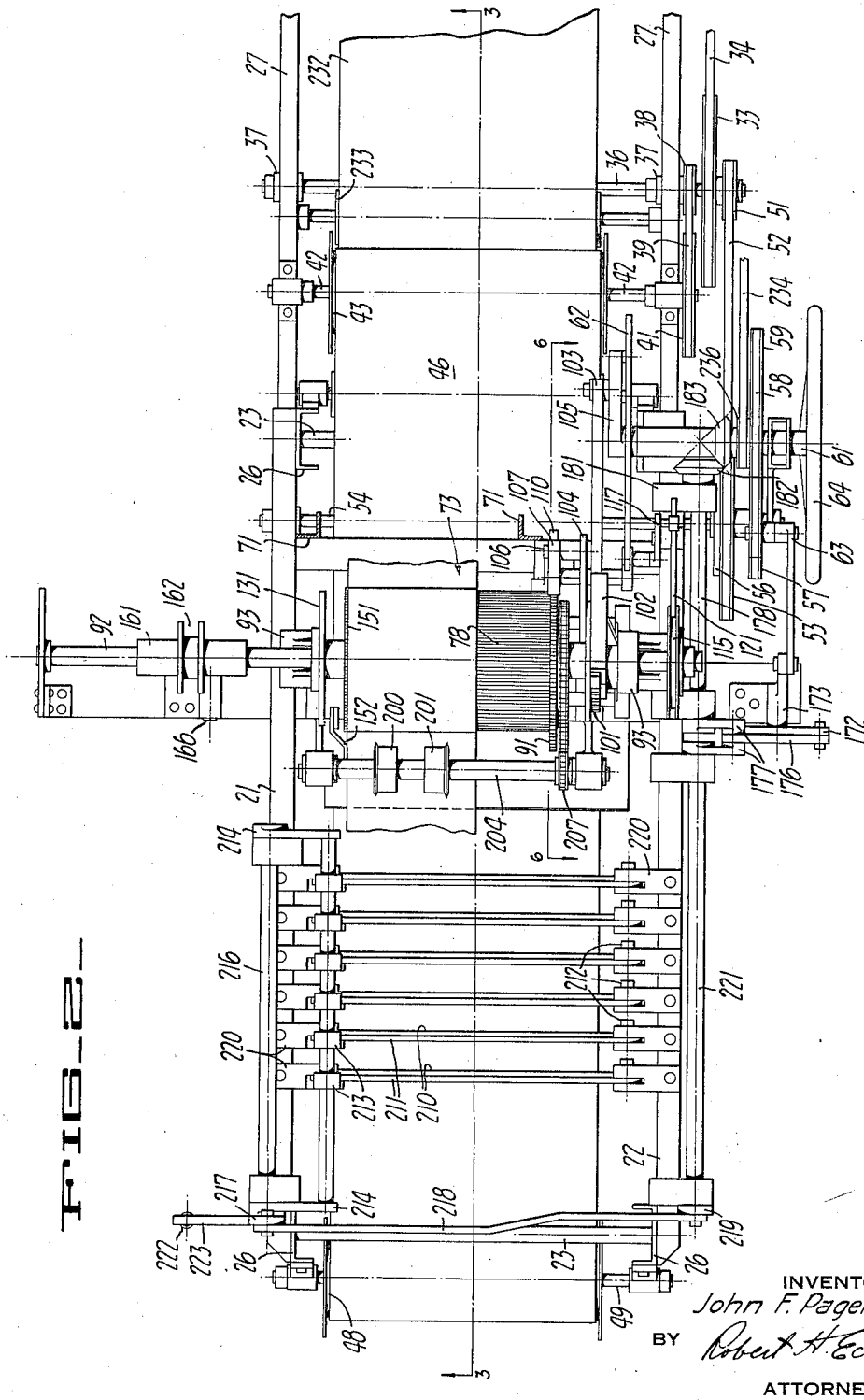
Figure 2 is a plan view with a portion of the machine cut away to illustrate the operating parts thereof.

Motive power for driving of the unit is provided from any suitable source, and in Figure 1 I have indicated an electric motor 31 carrying a pulley 32 which drives pulley 33 through a suitable V belt or other mechanical drive connection 34. The pulley 33 is secured upon a shaft 36 suitably journalled as at 37 upon the frame of the machine. The shaft 36 also carries a pulley 38 and a V belt 39 which is extended about pulley 38 and about another pulley 41 secured upon a shaft 42. The shaft 42 carries a roller 43 over which is extended a conveyor belt 46. The belt 46 extends to the rear of the sheet and over a pulley 48 mounted upon a shaft 49 also journalled upon the frame of the machine. The conveyor belt serves to move toward the front of the machine (toward the right of Figure 2) the completed articles, as will presently appear.

Shaft 36 also carries a pulley 51 and a V belt 52 is extended from this pulley about a pulley 53 which is secured to the driven side of a clutch 56 upon shaft 54. The clutch 56 is interposed between the freely rotating pulley and the shaft and serves to engage the pulley with the shaft whereby the shaft 54 is rotated selectively by the machine operator engaging and disengaging the clutch.

Also secured upon the shaft 54 for rotation therewith is a pulley 57. A V belt 58 is extended about this pulley and about a larger pulley 59 secured to shaft 61. Mounted for rotation with shaft 61 is the presently described brake and centering means operating cam 62. Idler 63 serves to keep the V belt 58 taut. Hand wheel 64 is mounted upon shaft 61 so that the machine can be rotated a selective amount for purposes of adjustment, if this be deemed necessary.

The paper feed

Means are provided for feeding into the machine a preformed continuous composite sheet.

Referring to Figures 1 and 3, I have shown a supporting frame 71 extending above the machine and including a guide 72 over which is passed the entering composite sheet 73. This sheet, as appears in Figure 13, is preferably formed with at least one outer face 74 as a flat and continuous sheet while the other face is corrugated longitudinally as at 75. The sheet can be formed of any suitable material, or combination thereof, such as paper, Cellophane, metal foil or other materials. The incoming composite sheet is fed through guide 76 supported from the same frame 71 and including two closely adjacent U members to smooth out and feed the sheet in a slot form. From the guide 76 the paper passes about a guide roller 77 closely adjacent to the grooved drum or tubular member 78, about which the sheet passes to emerge between itself and another guide roller 79. The tubular member 78 is suitably rotatably mounted upon shaft 92 which is supported in suitable supporting brackets 93 on each side of the machine.

As appears in Figures 5 and 13, the periphery of the tubular member, which is generally circular in cross sectional outline, is formed with a plurality of grooves therein 81, corresponding to the corrugations in the composite sheet. These cooperate with the rollers 77 and 79 to hold the composite sheet structure securely about the tubular member whereby the sheet is accurately and positively positioned and driven.

The drum drive

Means are provided for rotating the tubular member 78 a predetermined and a selected amount. This rotating means includes an intermittently rotated ratchet wheel 91 secured adjacent one end of the tubular member or drum. Rotatably mounted upon shaft 92 is a gear 101. Journalled upon the shaft 92 adjacent to the gear is a supporting bracket 102. This bracket acts as a support and guide for rack 103 which is engaged with gear 101. Secured to the gear 101 is a plate 104 and extending therefrom is a stub shaft 106 carrying a pawl 107 normally in engagement with ratchet wheel 91 on the drum or tubular member. Crank plate 105 is mounted upon shaft 61 and is rotatable therewith. The end of the rack is attached adjustably to the crank plate 105 so that the throw of the crank can be adjusted and the extent of rotation of the drum varied to advance more or less composite sheet.

The drum brake and lock

A drum brake and lock are provided to stop the drum and lock it while the wire is inserted. A pawl 110 is oscillatably mounted as at 111. This pawl carries a roller 112 held by a spring (not shown) in engagement with the cam 62. The pawl includes a tooth 113 adapted to fit against the ratchet wheel 91 and engage the same to locate the drum 78 in a selected position. When the cam 62 is rotated, the raised portion of the cam indicated by numeral 114 forces roller 112 to the right in Figure 6 and the tooth 113 is held positively against the ratchet wheel to locate it in a selected position while the wire is inserted.

To assist in locating the drum, I provide a suitable brake means and this by providing a deep V grooved pulley 115 on shaft 92. A lever 117 is oscillatably mounted on bracket 118. The lever carries a roller 119 and this roller is held by a spring (not shown) against the face of the cam 62. Engaged by a roller 120 on lever 117 is a brake member 121 carrying a section of brake lining fabric indicated at 122 and normally fitting into and bearing against the deep V groove in pulley 115. The brake member 121 is positioned and supported by the grooved pulley 115 and by roller 120 and bracket 118. When cam 62 is rotated the roller 119 is moved to rock lever 117 counterclockwise in Figure 6 and rocks the brake member whereby the brake member is pressed against the sides of the deep V grooved pulley 115, which slows down the drum and enables the pawl 110 to locate accurately in one of the teeth on the ratchet wheel and thus accurately align the drum.

The wire feeding mechanism

Wire feeding heads are provided about the periphery of the drum for feeding wire lengths into the positioned composite sheet on the drum while the drum is stationary. Each of these heads is generally indicated at 130 (Figure 5) and is mounted upon a suitable flanged support 131 concentric with drum shaft 92 and secured to one of the brackets supporting shaft 92. The heads 130 are spaced peripherally about the flanged bracket 131 at selected intervals so that the wires are inserted at predetermined, selected points. The attachment is secured by means of a slot 240 in a supporting plate 138 which fits over the flanged bracket 131. Screws 140 press a plate 135 against the bracket 131 on one side of the slot to secure the plate in a selected position.

Each of the wire feeding heads includes wire feeding rollers 133 and 134. Roller 133 is flanged as at 145 and fits within a complementary groove in roller 134, the wire being tightly gripped between, and thus positively fed by the rollers. Roller 133 is secured on a shaft 136, the shaft being journalled in a suitable bearing 137 in supporting plate 138. On the other end of the shaft is mounted a gear 139 also secured to this shaft and carrying a clutch 156, presently described. Gear 139 is rotated by a rack 141 which extends beyond the supporting plate 138 and is reciprocated as will presently appear. The other roller 134 is mounted for rotation upon a bearing 142, the bearing being carried in an eccentric 149 in the plate as appears in Figures 10 and 11. An adjusting means 143 is mounted upon the plate and includes a spring biased rod 150 extending therethrough and bearing upon the eccentric 149 for the bearing 142, the tension of the spring being adjusted by means of nut 146. In this way the tension placed upon the wire, as it passes between the rollers, can be adjusted and maintained constant. Suitable guide ways 147 and 148 are provided for the wire as it enters and leaves the rollers.

The drive for roller 133

Roller 133 is only rotated in one direction. Mounted within gear 139 is a slip clutch 156 which includes a driven inner member 157 carrying a plurality of rollers 158 which jam against the inner periphery of the gear 139 upon counterclockwise rotation of shaft 136, and which cause the roller 133 to feed in one direction by movement of rack 141 and to remain stationary upon the return movement of the rack.

The wire feed drive

Means are provided for reciprocating the rack

141. This means includes a sleeve 161 slideably mounted on shaft 92 and having a collar 162 thereon into which depends an arm 163 from each of the racks 141. A lever 164 is rotatably mounted upon the frame as at 166, one end of the lever is attached to the sleeve 161 by a suitable linkage indicated generally at 167. The other end of the lever is adjustably connected by a slideable collar 168 to a link 169, which is in turn connected to a slideable collar 171 carried upon a lever 172 rotatably mounted in a suitable bearing 173. The other end of the lever 172 is connected by a link 176 to crank arms 177 on the rotating shaft 178 and on shaft 221. Shaft 178 is suitably journalled in journals on one side of the machine such as those which appear at 181. One end of the shaft is provided with a miter gear 182 engaged with a miter gear 183 on shaft 61 whereby the shaft is driven. This serves to rotate the linkage system and to move each rack in and out, whereby the wire is advanced into the oppositely positioned corrugation, between the corrugated sheet and the outer facing sheet each time that the drum is brought to rest.

As many feeding devices as are desired can be placed about the flange supporting bracket and in operation I have successfully used as many as six at one time.

The wire cut-off

It is to be particularly noted, as appears in Figure 9, that each guide 148 extends closely adjacent to the rim of the grooved drum and that adjacent to the drum is provided a hardened slotted ring 151 while the composite sheet fits up snugly against this rim. In operation, the rollers 133 and 134 are driven to an extent such that the wire does not extend completely through the paper. Upon relative rotation between each guide 148 and rim 151, each wire is neatly and quickly severed. Subsequently, the projecting end of the wire is pushed on into the paper by cam plate 152 which rides against the side of the paper and pushes the end of each wire on into the corrugation. The operation is thus finally completed with the wire within the paper.

The scoring operation

As the paper emerges from the machine it is preferably scored lightly to retain the inserted wires after they are in place. To accomplish this I provide suitable scoring rollers 200 and 201 cooperating with scoring rollers 202 and 203. These rollers are mounted for rotation with shaft 204 and 205. A gear chain 206 is carried about gears 207 and 208 provided upon the shaft and about a gear 209 on shaft 92 to drive the rollers. This serves to lock the wire insert in position by providing a slight score line on opposite sides of the sheet.

The cut-off knives

As the completed composite sheet advances past the scoring rollers it passes between sets of fixed cutting knives 210 and movable cutting knives 211. The fixed and movable knives are arranged in pairs and each pair is slidably mounted between the channels 21 and 22 in U bases 220. The bases can be locked at any desired point, thus enabling the width of the cut to be varied. The movable knives are reciprocated at one time, and to this end each movable knife is hinged at 212 in its base mounting while its opposite end is supported by a link 213 from frame 214 secured on a shaft 216. Shaft 216 carries an upstanding arm 217 connected by link 218 to crank arm 219 carried upon shaft 221. Shaft 221 is connected to one of the crank arms 177, as has been heretofore explained. The oscillation of shaft 216 is biased by spring 222 effective as between the frame and lever 223 on the shaft 216.

The composite strip, severed from the sheet, is carried forward by the conveyor 46 to the forward portion of the machine, whereat it is discharged over guard lip 231 on to a stacking and sorting conveyor 232 mounted on and extended between rollers 233 and another roller not shown which is driven by belt 234 from pulley 236.

I believe that from the foregoing it will be apparent that I have provided a relatively simple and inexpensive, yet rugged and rapidly operating machine. As a brief summary of its operation, it is to be pointed out that the composite strip or sheet is fed into the machine intermittently but at a continual rate of advance. During each interval when the sheet is at rest, the wire insertion is made. As soon as the machine starts up into operation again the wire inserts are cut off and thereafter the extending ends of the wire are forced inwardly whereby the inserts are uniform and locked in place. This operation is continued, the strips being cut off between each wire insert to a desired width.

I claim:

1. In a machine of the character described, a device for intermittently feeding a composite sheet including a facing sheet carrying a corrugated sheet secured thereto, wire feeders for simultaneously inserting a plurality of wires between said corrugated sheet and said facing sheet, and means for scoring said composite sheet to retain inserted wires in place.

2. In a machine of the character described, a device for intermittently feeding a composite sheet including a facing sheet carrying a corrugated sheet secured thereto, wire feeders for simultaneously inserting a plurality of wires between said corrugated sheet and said facing sheet, means for cutting off inserted wires with a portion of each wire projecting from said sheet, means for forcing the wire projecting portion into the composite sheet, and means for scoring said composite sheet to retain inserted wires in place.

3. In a machine of the character described, a device for intermittently feeding a composite sheet including a facing sheet carrying a corrugated sheet secured thereto, wire feeders for simultaneously inserting a plurality of wires between said corrugated sheet and said facing sheet, means for scoring said composite sheet to retain inserted wires in place, and means for severing said composite sheet between inserted wires to provide individual sheet portions stiffened by said inserted wire.

4. In a machine of the character described, a device for intermittently feeding a composite sheet including a facing sheet carrying a corrugated sheet secured thereto, wire feeders for simultaneously inserting a plurality of wires between said corrugated sheet and said facing sheet, means for cutting off inserted wires with a portion of each wire projecting from said sheet, means for forcing the wire projecting portion into the composite sheet, means for scoring said composite sheet to retain inserted wires in place, and means for severing said composite sheet between inserted wires to provide individual sheet portions stiffened by said inserted wire.

5. In a machine of the character described an intermittently rotatable tubular member to receive a preformed composite sheet having at least one flat sheet thereon secured to a corrugated sheet, a plurality of separate wire feeders positioned about the periphery of said tubular member to feed and insert wires into said composite sheet between the flat sheet and the corrugated sheet when the tubular member is stationary, cutters for severing the inserted wires, and scoring knives for scoring the composite sheet as it leaves the tubular member to retain inserted wires.

6. In a machine of the class described, a plurality of separate spaced wire feeders, a rotatable tubular member for intermittently advancing past said wire feeders a composite sheet including at least a flat sheet bonded to a corrugated sheet, and operating mechanism for operating each of said wire feeders simultaneously during that period when the intermittently advanced sheet is at rest to insert a plurality of wires at spaced points between said flat and said corrugated sheets.

7. In a machine of the class described, a plurality of separate spaced wire feeders, a rotatable tubular member for intermittently advancing past said wire feeders a composite sheet including at least a flat sheet bonded to a corrugated sheet, operating mechanism for operating each of said wire feeders simultaneously during that period when the intermittently advanced sheet is at rest to insert a plurality of wires at spaced points between said flat and said corrugated sheets, and scoring knives for scoring the composite sheet with the inserted wires as the sheet is advanced after said rest period.

8. In a machine of the character described, a feeding device comprising a rotatable tubular member having a plurality of grooves on the outer face thereof extending substantially parallel to the axis of rotation of said tubular member, means for intermittently rotating said tubular member, means for feeding a composite sheet onto said tubular member, said sheet having a corrugated face fitting into said plurality of grooves, means for feeding wire spaced about said tubular member at an end thereof to feed wire into said composite sheet on said tubular member at a plurality of selected points, and means for operating said wire feeding means during the interval between rotational movements of said tubular member.

9. In a machine of the character described, a rotatable tubular member having a plurality of grooves on the outer face thereof extending substantially parallel to the axis of rotation of said tubular member, means for intermittently rotating said tubular member, means for feeding a composite sheet onto said tubular member, said sheet having a corrugated face fitting into said plurality of grooves, and a plurality of means for feeding wire spaced about said tubular member at an end thereof to feed wire into a composite sheet on said tubular member at a plurality of selected points, said wire feeding means fitting closely adjacent to said tubular member to cooperate with said tubular member, upon rotation thereof, to sever each positioned wire extended and positioned from said feeding means in said sheet on said tubular member.

10. In a machine of the character described, a rotatable tubular member having a plurality of grooves on the outer face thereof extending substantially parallel to the axis of rotation of said tubular member, means for feeding a composite sheet onto said tubular member, said sheet having a corrugated face fitting into said plurality of grooves, means for feeding wire spaced about said tubular member at an end thereof to feed wire into a composite sheet on said tubular member at a plurality of selected points, and means, including a drive and timing mechanism for operating the feeding means and the tubular member alternately and intermittently to insert wire into a stationary section of said composite sheet and then advance a new section of sheet to receive wire.

JOHN F. PAGENDARM.